(12) United States Patent
McKeen et al.

(10) Patent No.: US 10,970,390 B2
(45) Date of Patent: Apr. 6, 2021

(54) MECHANISM TO PREVENT SOFTWARE SIDE CHANNELS

(71) Applicant: Intel Corporation, Santa Clara, CA (US)

(72) Inventors: Francis McKeen, Portland, OR (US); Bin Xing, Hillsboro, OR (US); Krystof Zmudzinski, Forest Grove, OR (US); Carlos Rozas, Portland, OR (US); Mona Vij, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 15/897,406

(22) Filed: Feb. 15, 2018

(65) Prior Publication Data

US 2019/0251257 A1 Aug. 15, 2019

(51) Int. Cl.
*G06F 21/55* (2013.01)
*G06F 21/53* (2013.01)
(Continued)

(52) U.S. Cl.
CPC .......... *G06F 21/556* (2013.01); *G06F 12/145* (2013.01); *G06F 12/1491* (2013.01);
(Continued)

(58) Field of Classification Search
CPC ........ G06F 21/53; G06F 21/556; G06F 21/74; G06F 12/145; G06F 12/1491
See application file for complete search history.

(56) References Cited

U.S. PATENT DOCUMENTS

| 5,479,627 A | * | 12/1995 | Khalidi | ............... G06F 12/1027 711/205 |
| 5,594,886 A | * | 1/1997 | Smith | ................... G06F 12/125 711/118 |

(Continued)

FOREIGN PATENT DOCUMENTS

WO  2011078855 A1  6/2011

OTHER PUBLICATIONS

Y. Sun and T. Chiueh, "SIDE: Isolated and efficient execution of unmodified device drivers," 2013 43rd Annual IEEE/IFIP International Conference on Dependable Systems and Networks (DSN), Budapest, 2013, pp. 1-12,. (Year: 2013).*

(Continued)

*Primary Examiner* — Kari L Schmidt
(74) *Attorney, Agent, or Firm* — Nicholson De Vos Webster & Elliott LLP

(57) ABSTRACT

A processor includes a processing core to identify a code comprising a plurality of instructions to be executed in the architecturally-protected environment, determine that a first physical memory page stored in the architecturally-protected memory matches a first virtual memory page referenced by a first instruction of the plurality of instructions, generate a first address mapping between a first address of the first virtual memory page and a second address of the first physical memory page, store, in the cache memory, the address translation data structure comprising the first address mapping, and execute the code by retrieving the first address mapping in the address translation data structures to be executed in the architecturally-protected environment, determine that a first physical memory page stored in the architecturally-protected memory matches a first virtual memory page referenced by a first instruction of the plurality of instructions, generate a first address mapping between a first address of the first virtual memory page and a second (Continued)

address of the first physical memory page, store, in the cache memory, an address translation data structure comprising the first address mapping, and execute the code by retrieving the first address mapping stored in the address translation data structure.

20 Claims, 12 Drawing Sheets

(51) Int. Cl.
    *G06F 12/14*     (2006.01)
    *G06F 21/74*     (2013.01)

(52) U.S. Cl.
    CPC .............. *G06F 21/53* (2013.01); *G06F 21/74* (2013.01); *G06F 2212/1052* (2013.01); *G06F 2221/2149* (2013.01)

(56) References Cited

U.S. PATENT DOCUMENTS

| | | | |
|---|---|---|---|
| 5,948,097 A | 9/1999 | Glew et al. | |
| 6,671,791 B1* | 12/2003 | McGrath | G06F 12/1009 711/206 |
| 7,870,336 B2* | 1/2011 | Erlingsson | G06F 12/1441 711/118 |
| 9,405,708 B1* | 8/2016 | Pohlack | G06F 21/54 |
| 10,831,506 B2* | 11/2020 | Mortensen | G06F 9/5011 |
| 2002/0169979 A1* | 11/2002 | Zimmer | G06F 9/4401 726/1 |
| 2003/0101322 A1 | 5/2003 | Gardner | |
| 2006/0080372 A1* | 4/2006 | Barua | G06F 9/5016 |
| 2008/0244155 A1* | 10/2008 | Lee | G06F 12/145 711/6 |
| 2011/0047376 A1* | 2/2011 | Mittal | G06F 21/602 713/164 |
| 2011/0314468 A1* | 12/2011 | Zhou | G06F 9/45558 718/1 |
| 2012/0159184 A1* | 6/2012 | Johnson | G06F 21/6218 713/189 |
| 2012/0303971 A1* | 11/2012 | Palka | G06F 21/562 713/189 |
| 2013/0031352 A1* | 1/2013 | Driscoll | G06F 9/547 713/100 |
| 2013/0159726 A1* | 6/2013 | McKeen | G06F 21/72 713/189 |
| 2014/0007087 A1* | 1/2014 | Scott-Nash | G06F 21/53 718/1 |
| 2014/0245444 A1 | 8/2014 | Lutas et al. | |
| 2014/0258733 A1* | 9/2014 | Scott-Nash | G06F 12/1408 713/190 |
| 2014/0297962 A1* | 10/2014 | Rozas | G06F 12/0808 711/135 |
| 2015/0002526 A1* | 1/2015 | Ginzburg | G06T 1/60 345/568 |
| 2015/0033316 A1* | 1/2015 | Scarlata | H04L 9/3213 726/9 |
| 2015/0095611 A1* | 4/2015 | Popat | G06F 12/1027 711/207 |
| 2015/0100738 A1* | 4/2015 | Wang | G06F 12/1027 711/135 |
| 2015/0278106 A1* | 10/2015 | Gschwind | G06F 12/10 711/202 |
| 2015/0378766 A1* | 12/2015 | Beveridge | G06F 16/273 718/1 |
| 2015/0378941 A1* | 12/2015 | Rozas | G06F 21/00 710/267 |
| 2016/0140042 A1* | 5/2016 | Mukherjee | G06F 12/0891 711/123 |
| 2016/0147619 A1* | 5/2016 | Borthakur | G06F 12/1009 714/768 |
| 2016/0283404 A1* | 9/2016 | Xing | G06F 21/53 |
| 2016/0283409 A1* | 9/2016 | Pandey | G06F 21/57 |
| 2016/0364341 A1 | 12/2016 | Banginwar et al. | |
| 2017/0097896 A1* | 4/2017 | Molnar | G06F 12/145 |
| 2017/0177457 A1* | 6/2017 | Swanson | G06F 1/24 |
| 2017/0269867 A1* | 9/2017 | Fahrig | G06F 9/45558 |
| 2018/0004675 A1* | 1/2018 | Shanbhogue | G06F 12/1009 |
| 2018/0095894 A1* | 4/2018 | Leslie-Hurd | G06F 3/0604 |
| 2018/0114013 A1* | 4/2018 | Sood | G06F 9/45558 |
| 2019/0012271 A1* | 1/2019 | Avoinne | G06F 1/3287 |
| 2019/0042299 A1* | 2/2019 | Neiger | G06F 12/1475 |
| 2019/0102538 A1* | 4/2019 | Gentili | G06F 21/53 |

OTHER PUBLICATIONS

C. Liu, K. Chen and C. Chen, "CASL hypervisor and its virtualization platform," 2013 IEEE International Symposium on Circuits and Systems (ISCAS), Beijing, 2013, pp. 1224-1227. (Year: 2013).*

Chakrabarti, Somnath, et al. "Intel® Software Guard Extensions (Intel® SGX) Architecture for Oversubscription of Secure Memory in a Virtualized Environment." Proceedings of the Hardware and Architectural Support for Security and Privacy. 2017. 1-8. (Year: 2017).*

Van der Maas, Marno, and Simon W. Moore. "Protecting Enclaves from Intra-Core Side-Channel Attacks through Physical Isolation." Proceedings of the 2nd Workshop on Cyber-Security Arms Race. 2020.1-12. (Year: 2020).*

Chen, Sanchuan, et al. "Detecting privileged side-channel attacks in shielded execution with Déjá Vu." Proceedings of the 2017 ACM on Asia Conference on Computer and Communications Security. 2017. 7-18. (Year: 2017).*

European Search Report for European Application No. EP19 15 1998, 8 pages, dated Jun. 13, 2019.

European Communication pursuant to Article 94(3) EPC, EP App. No. 19151998.2, dated Mar. 31, 2020, 9 pages.

European Search Report and Search Opinion, EP App. No. 19151998. 2, dated Jun. 25, 2019, 9 pages.

* cited by examiner

US 10,970,390 B2

MECHANISM TO PREVENT SOFTWARE SIDE CHANNELS

TECHNICAL FIELD

The present disclosure relates to processors and, more specifically, to a processor including circuits that implement the address pre-translation in an enclave environment.

BACKGROUND

One approach for creating and maintaining a secured, protected, or isolated execution environment (referred to as an architecturally protected execution environment) is to employ a secure enclave to protect code and data.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
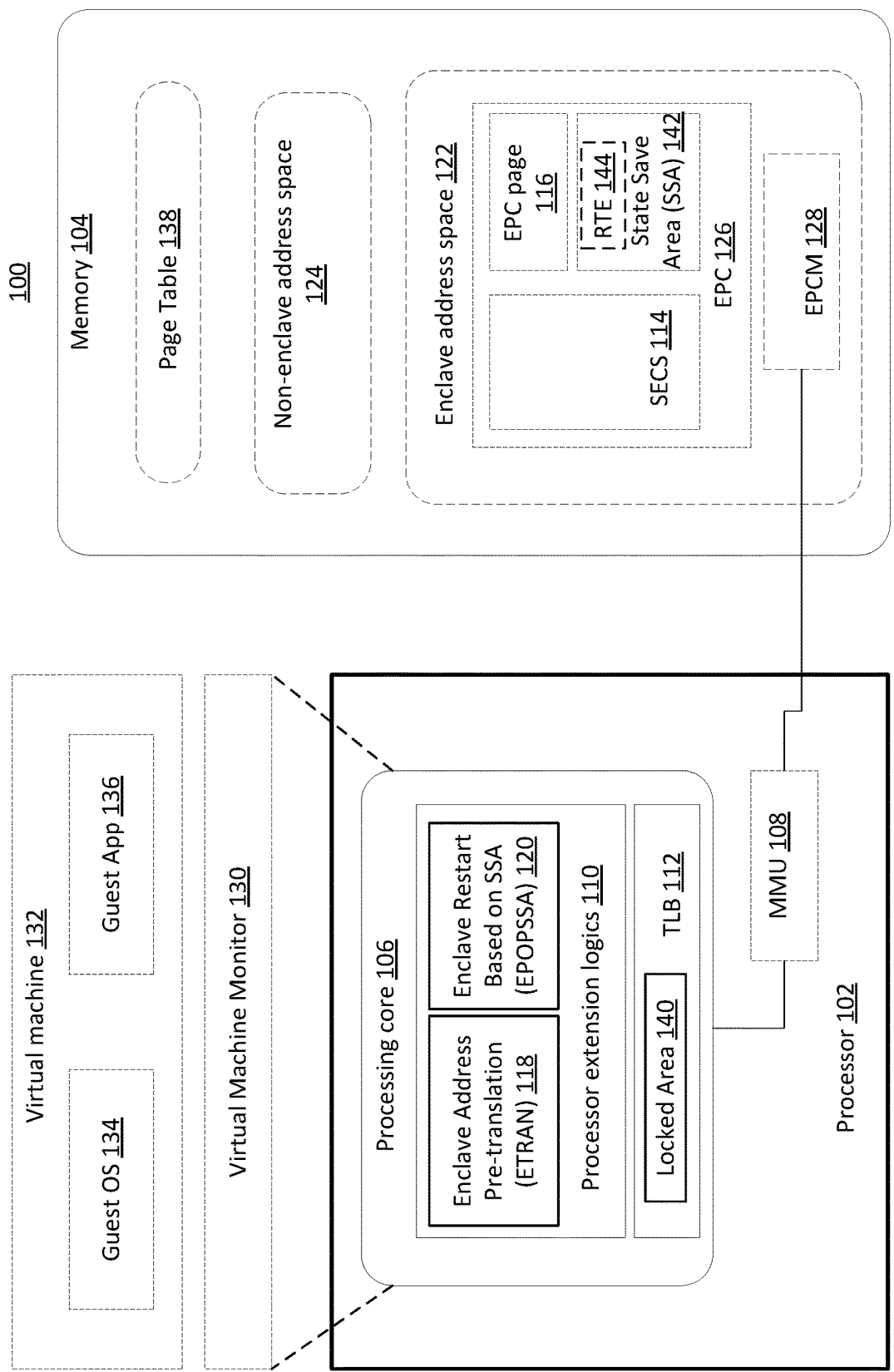
FIG. 1 illustrates a processing system according to an embodiment of the present disclosure.

A secure enclave is a private memory region allocated by a program that is not accessible by other applications (e.g., a process at a higher privilege levels). A processor having the secure enclave capabilities prevents access to the enclave memory region (i.e., the protected area defined in the application's address space) by other software even if such access is attempted by higher-privileged software such as system software including the operating system and the virtual machine monitor (VMM).

Although the ring system (a hierarchical protection domains referred to as protection rings (e.g., rings 0-3)) may protect memory regions reserved for applications running at a higher privilege level against unauthorized accesses by application running at a lower (or equal) privilege level, the ring system does not protect data used by an application of lower privilege level against accessing by an application running at higher privilege levels. In certain situations, the application running at a higher privilege level (e.g., the operating system or the virtual machine monitor (VMM)) may have been compromised by malicious attacks. The compromised applications may make furthers attacks on data used by an application running at a lower privilege level. In some implementations, a programmer may provide an application executed by a processor at a lower privilege level (e.g., ring 3) with an architecturally protected memory region to store code and data that is private to the application and cannot be accessed by a higher privilege level application (e.g., an application with a ring 0-2 privilege). Thus, a processor may execute at least a portion (or whole) of the less privileged application in the architecturally protected execution environment, protected against malicious originated from a higher privileged domain (e.g., the operating system).

In some implementations, the architecturally protected execution environment can be provided in the form of a secure enclave. A secure enclave may include a protected area within the memory address space associated with the application. The enclave may prohibit any access to the enclave memory region by other software even if such an access is attempted by system software.

In some implementations, the secure enclave is implemented on the processor reserved memory (PRM) that is protected by the processor from non-enclave memory accesses, including those accesses from the kernel of an operating system or the VMM. The PRM may include an Enclave Page Cache (EPC) which is a protected memory region where enclave pages and attribute data structures are stored. The EPC may include fixed-size pages (e.g., 4 KB per page) to store code and data associated with different secure enclaves. A secure enclave may be associated with a set of EPC pages that may be managed by the processor through a data structure (referred to as the Enclave Page Cache Map (EPCM)). The EPCM may include a plurality of entries with each entry storing attribute values of a corresponding EPC page associated with the secure enclave. The attribute values may indicate the type of the pages (regular data or control structure) and hardware information used by the processor to manage the enclave.

The processor may execute a system software (e.g., the operating system) to set up control structure of the EPC. The system software can be a virtual machine monitor (VMM) and a kernel of an operating system (including a guest operating system (OS)) supported by the VMM.

The instructions used to implement a secure enclave and its functionalities may include a processor extension logic circuit (e.g., circuits corresponding to SGX instruction extension) and microcode (referred to as the enclave logic) associated with a processor. To improve the efficiencies of secure enclaves, the enclave logic may implement instructions for allocating unused EPC pages to an enclave and free previously allocated EPC pages.

Some implementations of secure enclave may be vulnerable to a type of attacks originated from the system software (e.g., guest operating system or VMM) running outside the enclave. The attacker can observe page fault events and learn code execution of software applications inside the enclave based on the observed page fault events. For example, an attacker (from the guest operating system or VMM) may unmap all enclave pages from the page table (and the extended page table (EPT)). When a processing core attempts to access the enclaved memory pages (e.g., executing the enclaved code or accessing data), page faults (#PF) or EPT violations are generated by the processor. The page faults and EPT violations are described in a vector of Interrupt Description Table (IDT) and delivered to the operating system or VMM for further processing. In this way, the attacker may acquire information inside the enclave. One of these attacks is referred to as a flow-control side channel. In such an attack, the attacker (e.g., a system software) may mark all the memory pages inside an enclave as not present (e.g., by setting the present/absent bit of the page table entry associated with the memory page to "absent"). This could happen when the attacker gains the privilege of system software (e.g., the VMM or guest operating system). Because the memory pages are marked as absent from the memory, the execution of a program in the enclave may cause the memory management unit (MMU) to generate a page fault or EPT violation indicating the absence of the physical page. The processor executing the system software (e.g., the guest operating system) may detect the page fault event and thus derive the memory page information from the page faults. By continuously observing the page faults, the attacker (e.g., the guest operating system) can learn when the data and code pages are accessed inside the enclave, thus acquiring unauthorized access to the enclave.

In one example attack, the attacker may gain access to the source code of the enclave. The attacker identifies portions of the source code where target data are processed. The target data may be in the pages that the attacker set the P bit to not-present in the page table and the extended page table. Then, the attacker can either "manually" determine in what order faults would occur based on the input values submitted to the target code, or the attacker could run the target code with various input values and record those fault sequences. In either case, the attacker would produce a mapping between input values and page fault sequences from which the attacker can deduce the information about the enclave.

One way to mitigate the software control side channel is to program the enclave to stop emitting control flow information when accessing memory. For example, by placing all of the code within one physical memory page, the enclave can prevent the attacker from learning about the code execution inside the enclave because all page faults are directed to a single page. This type of software solution, however, requires detailed inspection of the program and is prone to programmer error.

To overcome the above-stated and other deficiencies, embodiments of the present disclosure provide a technical solution including pre-translation of the memory addresses prior to executing the enclaved code including instructions that reference virtual memory pages that need to be translated into physical memory pages in the enclave. The address pre-translation identifies all physical memory pages needed for executing these instructions and the address mappings are stored in a cache storage, thus removing the opportunity to cause page faults and mitigating the control flow side channel risk to the enclave.

Embodiments of the present disclosure provide for a first enclave logic circuit (corresponding to an enclave translation instruction (referred to as ETRANS)) that may perform address pre-translation for a segment of enclaved code and store the translations in a local storage (e.g., TLB) upon entering an enclave (e.g., executing EENTER). This may eliminate the risk to generate page faults during the execution of the enclaved code because all memory address translations are already available locally, thus eliminating the opportunity by an observer (e.g., the attacker) outside the enclave to monitor the page faults. The address pre-translation may generate an address translation data structure in a local storage. The data structure may include entries to store virtual to physical memory mappings for all instructions in the code to be executed in the enclave. During the code execution after the pre-translation phase, the execution unit of the processor may find all the needed memory address translation in the address translation data structure. The process to generate the address translation data structure may be interrupted by an interruption event (e.g., a page fault because the processor may determine that a requested physical memory page is not in the memory and needs to be loaded from a storage device.). Responsive to detecting occurrence of the interruption event, the processor may store the states of the processor in a state save area (SSA) associated with the enclave and the cause an exit of the address pre-translation. The state information of the processor stored in SSA can be used to resume the enclave later.

Embodiments of the present disclosure may further include a second enclave logic circuit (corresponding to an enclave resume from pre-translation state instruction (referred to as EPOPSSA) that may resume the enclave (i.e., enter an interrupted enclave execution from outside the enclave) based on the states stored in the SSA associated with the enclave. In one embodiment, the ERESUME instruction is disabled (e.g., by setting a control flag to indicate the disablement) at the creation of the enclave so that the enclave has to be reentered by using EENTER and ETRANS. In another embodiment, the processor may execute an application program including instructions to disable the ERESUME temporarily and turn the call to ERESUME into the call to EENTER. As such, any resumption of the enclave starts from address pre-translation before resuming the enclave using EPOPSSA.

FIG. 1 illustrates a processing system according to an embodiment of the present disclosure. As shown in FIG. 1, processing system 100 (e.g., a system-on-a-chip (SOC)) may include a processor 102 and a memory device 104 communicatively coupled to processor 102. Processor 102 may be a hardware processing device such as, for example, a central processing unit (CPU) or a graphic processing unit (GPU) that includes one or more processing cores (not shown) to execute software applications. Processor 102 may further include one or more processing cores 106 and a memory management unit (MMU) 108 for performing memory address translation for processing core 106. In one embodiment, MMU 108 is part of processor 102. In another embodiment, MMU 108 is a discrete hardware circuit that is separate from processor 102. Processing cores 106 may be associated with multiple level caches (not shown) including level L1-L3 caches.

Figure 6:
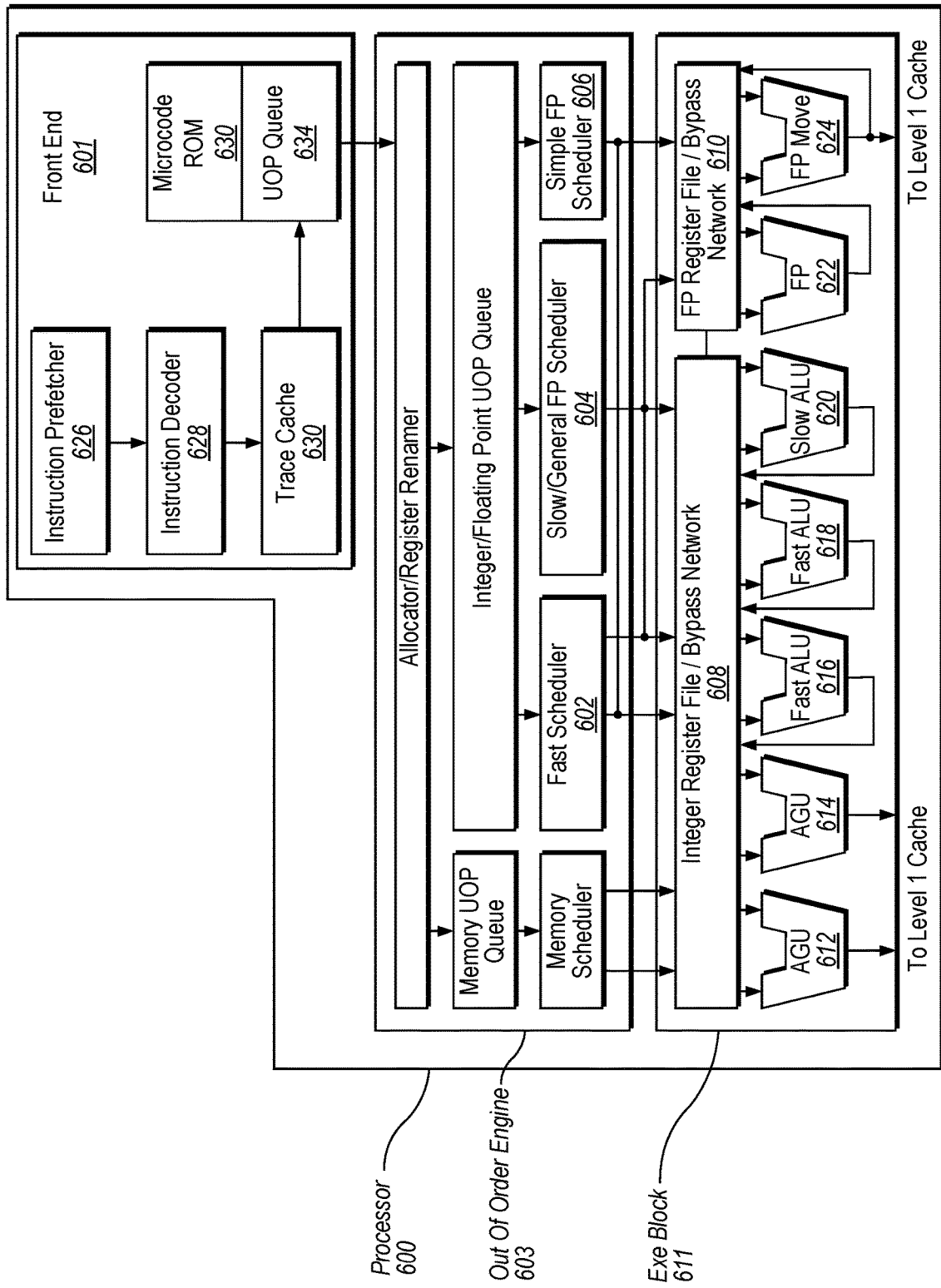
FIG. 6 illustrates a block diagram of the micro-architecture for a processor that includes logic in accordance with one embodiment of the disclosure.
Figure 7:
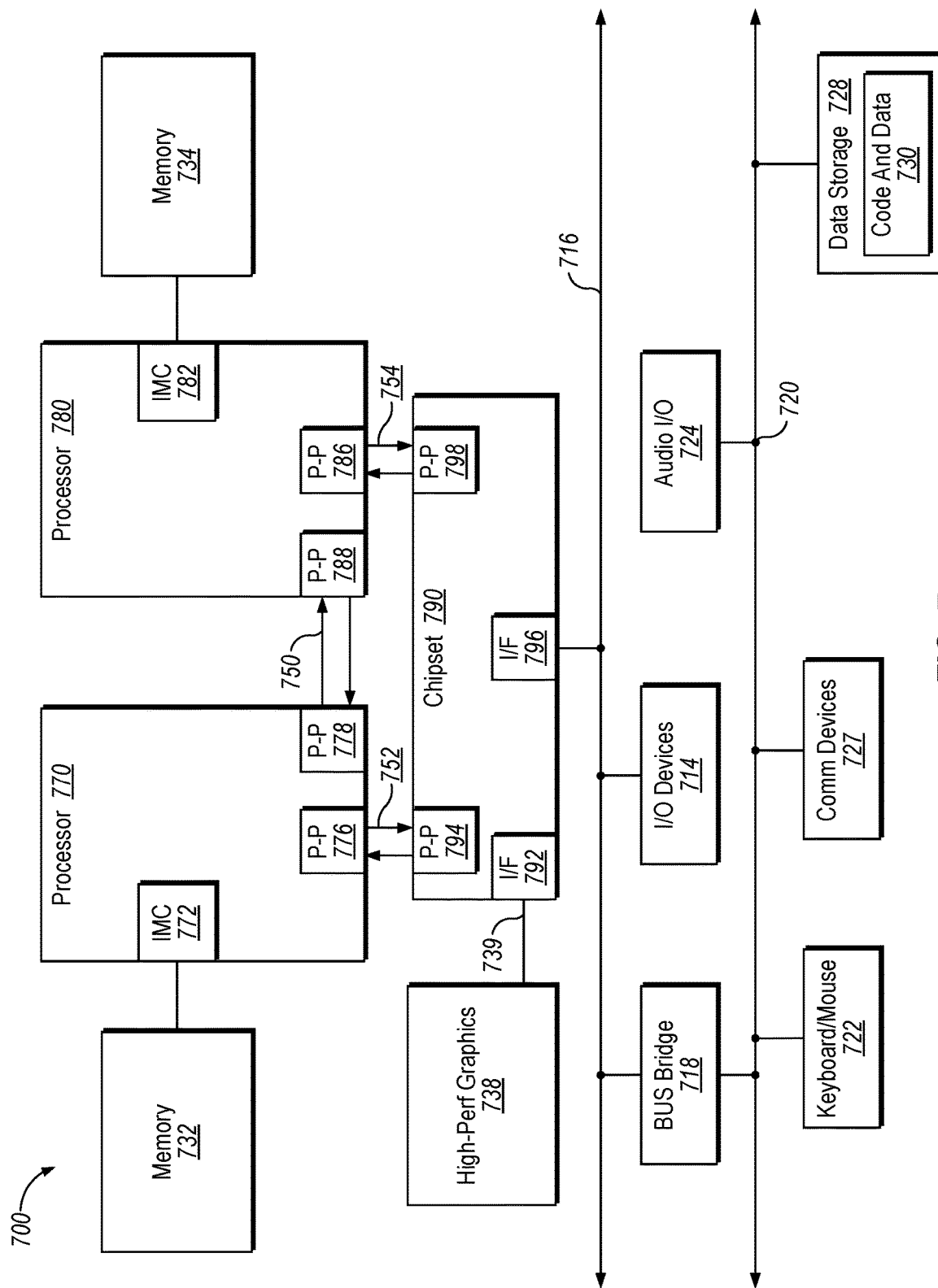
FIG. 7 is a block diagram illustrating a system in which an embodiment of the disclosure may be used.

Processing cores 106 in various implementations may be provided by in-order cores or out-or-order cores. In an illustrative example, processing core 106 may have a micro-architecture including processor logic and circuits used to implement an instruction set architecture (ISA). Processors 102 with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file), as illustrated by FIGS. 6-7.

Processor 102 may further include processor extension logic circuits 110 to implement extended instruction sets to support additional functionalities of processor 102. In one embodiment, processor extension logic circuits 110 may support execution of a set of virtualization instructions (e.g., virtual-machine extension (VMX)) to provide support for one or more virtualization environments ported on host. The VMX may provide processor-level support for virtual machines. In one embodiment, the VMX may include instructions to generate a virtual machine monitor (VMM) 130 that is a host program that allows one or more execution environments (or virtual machines (VMs) 132) to run on the host. VMM 130 may create and run virtual machines (VMs) 132.

VMs 132 may behave like hardware computing devices to end users. For example, VMs 132 may each include one or more virtual processors (not shown) emulating a hardware processors. The virtual processor associated with VMs 132 may support a respective guest operating system (guest OS) 134. Guest applications 146 may run within the environments of guest operating systems 134. Guest operating systems 134 (including kernels) can include a number of guest-OS components (or kernel components) to provide a number of services to guest applications 136. In one embodiment, these guest-OS components run at the same processor privilege level (e.g., the highest ring 0 privilege level). In one embodiment, the guest-OS-provided services may include scheduler, process management, I/O management, memory management, drivers (e.g., file system and volume drivers, mass storage drivers, and bus drivers), and code integrity management services. The ring 0-2 privilege levels are commonly referred to as the supervisor mode and the ring-3 privilege level is commonly referred to as the user mode.

Guest OS 134 may provide a scheduling service to the execution of guest application 136, and the scheduling service may allow the application's execution being carried out in threads. A thread of execution is the smallest sequence of program instructions that can be managed independently a task scheduler of an OS (e.g., the guest OS 134). The execution of a thread is carried out by a logical processor. The number of logical processors associated with a VM 132 may define the maximum number of threads that the guest OS 134 can handle. All these logical processors, when executing threads associated with the program code of guest application 136, may share a guest physical address space that may be mapped to a physical address space of memory 104 by memory management unit 108.

VMs 132 include guest OS 134 and guest application 136 that may access memory 104 through a series of memory address mappings. Guest OS 118 may construct a guest virtual address (GVA) space and map the GVA space to a corresponding guest physical address (GPA) space for VM 132. GPA space may be organized according to guest memory pages that each has a pre-defined size. Each one of the guest memory pages may be associated with an identifier that uniquely identifies the guest memory page. Memory management unit 108 may map the GPA space associated with VM 132 to the host physical address (HPA) space of the memory 104 of a host. During execution of a guest application 136, responsive to a request to access memory 104, memory management unit 108 may map the virtual addresses used by the application to the host physical addresses so that the application can access memory 104. The HPA space may be organized according memory frames that each has a pre-defined size. Each one of the memory frames may be associated with an identifier (e.g. memory frame number) that uniquely identifies the memory frame. As discussed above, the execution of guest application 136 may be carried out in multiple threads on multiple logical processors that share the GPA space that is mapped to the HPA space.

In one embodiment, in addition to the VMX extensions, processor extension logic circuits 110 may include logic circuits (referred to as the enclave logic) to implement software safeguard extensions (SGX) instructions that, when executed, may perform services related to secure enclaves. The SGX instructions may include instructions to create (ECREATE), load (EADD), and initialize (EINIT) an enclave. The system software may execute an enclave create instruction to create a secure enclave. The creation of the secure enclave may generate a new SGX enclave control structure (SECS) including fields to store attribute values associated with the secure enclave. The attributes in the SECS page may include an enclave identifier that uniquely identifies the secure enclave. In one embodiment, the SECS may be stored in a special EPC page as defined above (referred to as an SECS page) that is not addressable by applications not residing in the secure enclave. The execution of the enclave creation instruction marks the newly created SECS as uninitialized.

An active secure enclave (after initialization) may be divided into an encrypted portion and a decrypted portion. The encrypted portion may reside in an unprotected memory (such as main memory or disk). The decrypted portion resides in CPU cache MMU 108 may translate addresses for EPC 126 residing within the enclave physical address space 122 assigned to the secure enclave stored in memory 104. The Enclave Page Cache Map (EPCM) 128 also residing the physical address space 122 is a protected structure employed by the processing system to store attributes of the EPC. Memory 104 may also include regions that can be referenced by a non-enclave address space 124. In one embodiment, EPCM 128 may be stored as a special EPC page. EPCM 128 may include one or more entries with each entry corresponding to an EPC page in the EPC 126. Each EPCM entry may hold, in an implementation-dependent format, the following information: whether the EPC page is valid or invalid (VALID/INVALID); an identifier of the secure enclave instance that owns the page; the type of the page (regular data and control data structure types); the virtual address through which the enclave is allowed to access the page; read/write/execute permissions for the page; whether the page is accessible or not (BLOCKED or UNBLOCKED).

System software may use EPCM 128 in the address translation flow to enforce access-control on the EPC pages loaded into the EPC 126. Various enclave-related functions may be implemented in the microcode, supported by the hardware implementations of SGX and the processing logic implementing the enclave functionality. In certain implementations, the processing logic may control the access to EPC 128 via translation lookaside buffer (TLB) 112 associated with processing core 106.

The mapping from the virtual addresses employed by virtual machine 132 and the physical addresses of memory 104 may be stored in translation lookaside buffer (TLB) 112 that may implement a mapping table for translating virtual addresses to physical addresses. TLB 112 may store the memory address mappings that have been used by logical processors to facilitate later repeated use of the memory address mappings. A "TLB hit" refers to a situation when a requested virtual address is present in the TLB. A "TLB miss" refers to the opposite situation: when the requested virtual address is not present in TLB 112, the address translation may proceed by looking up the page table. After the physical address is determined, the virtual address to physical address mapping may be entered into the TLB 112 for the convenience of address translation. The system software (e.g., VMM 130) may create entries in its page tables pointing to SECS page 114 that includes information to identify and mange a secure enclave. However, the system software cannot access the SECS page 114.

Each TLB entry may include one or more bits indicating identifying the enclave owning the memory location referenced by the TLB entry. Alternatively, if these bits are not provided, a TLB flush is performed when exiting the secure enclave to prevent unauthorized access to EPC 126.

Between the time when a secure enclave is initiated and the time when it is destructed (e.g., by issuing an enclave remove instruction (e.g., EREMOVE)), the code in the enclave can be executed by any applications that have the enclave's EPC pages mapped into the virtual address spaces associated with these applications.

The enclave logic of processor 102 may implement an enclave entry instruction (EENTER) that, when executed, starts the execution of the code in the enclave and an enclave exit instruction (EEXIT) that, when executed, returns the execution control to back to the software application that invokes the enclave.

MMU 108 may employ a page table 138 to perform virtual memory address to physical memory address translation for processing core 108. Page table 138 can be a data structure stored in a designated area in memory 104. Page table 138 may include page table entries to store mappings between virtual memory addresses and physical memory addresses.

Figure 2:
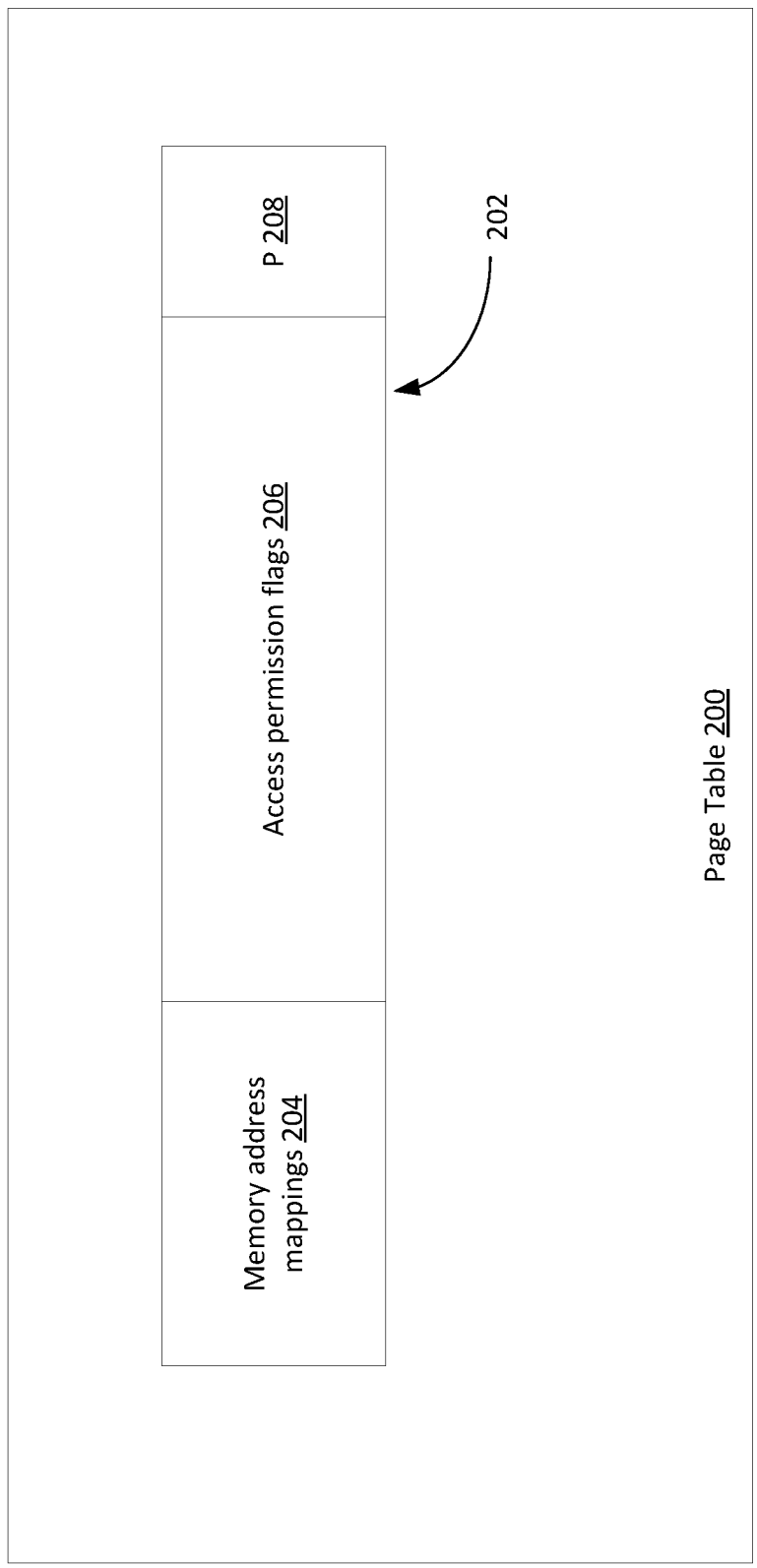
FIG. 2 illustrates a page table 200 according to an embodiment of the present disclosure.

FIG. 2 illustrates a page table 200 according to an embodiment of the present disclosure. As shown in FIG. 2, page table 200 may include page table entries 202 which include fields to store information relating to memory address mapping. Page table entry 202 may include a first field 204 to store virtual address to physical memory address mapping (i.e., correspondences between virtual page identifier to memory frame identifier), a second field 206 to store access permission flags. The access permission flags may include write (W) bit and/or execute-disable (XD) bit associated with the supervisor mode, and/or write (W') bit and/or execute-disable (XD') bit associated with the user mode. The access permission flags may also optionally include read bit (R) associated with the supervisor mode and/or read (R') bit associated with the user mode. Page table entry 202 may further include a first present/absent bit (P). The P bit, when set to "Present," may indicate that the physical memory page corresponding to the virtual memory address is present in the memory. The P bit, when set to "Absent," may indicate that the physical memory page corresponding to the virtual memory address is absent in the memory. The page table entries 202 may also include a S/U bit that corresponds to a supervisor mode when set and to a user mode when unset. The operating system may set an entry to supervisor mode to prevent access by user applications.

Referring to FIG. 1, responsive to receiving a virtual address referenced by an instruction executed by processing core 106, MMU 108 may look up a page table 138 to determine whether there is a page table entry to contain a mapping to translate the virtual memory address to a physical memory page corresponding to the virtual memory address already exists in memory 104. Responsive to identifying that the physical memory page exits in memory 104, MMU 108 may translate the virtual memory address for processing core 106. Responsive to identifying that the physical memory page is absent in memory 104, MMU 108 may generate a page fault to notify processing core 106 that the physical memory is absent and cause system software (e.g., guest OS 134 or VMM 130) executed by processing core 106 to load the required physical memory page from a storage device (e.g., a remote memory or the disk). Although EPC pages 116 in enclave address space 122 used by an application to protect a critical portion of code are shielded from other applications (including system software), the page faults generated by MMU 108 for detecting absent physical memory pages can be observed by system software (e.g., guest OS 134 or VMM 130) executed by processing core 106. In a software control side channel attack, the attacker may cause system software to mark page table entries corresponding to EPC pages 116 as absent. When the execution of the application enters into the enclave, pages faults are generated because the pages are marked as absent, thus leaking the information as to which physical memory pages are to be used within the enclave address space 122. The leakage of information about the physical memory pages within an enclave makes the enclave vulnerable to software side channel attacks.

Embodiments of the present disclosure provide a preamble enclave instruction (referred to as "ETRANS") 118 that may, prior to the execution of a segment of enclaved code including instructions, perform address pre-translation for EPC pages 116 to be used by the enclaved code, and further store the memory address mapping generated by executing ETRANS 118 in an area 140 of TLB 112. In one embodiment, the TLB area 140 is locked to the enclave. Namely, the locked area 140 assigned to the enclave at the entry of the enclave is not an eviction victim when the TLB is full, and it is flushed at the exit of the enclave.

During the address pre-translation phase, it may occur that the requested EPC page 116 is not in enclave address space 122. Responsive to detecting a missing EPC page 116, processing core 106 may generate a page fault and exit the enclave. Prior to exiting the enclave, processing core 106 may store the architectural state values associated with executing the enclave in a state save area (SSA) 142 of EPC 126. In one embodiment, SSA 142 can be implemented as a stack including parameter frames. Upon exiting the enclave, processing core may push the current architectural state values of the logic processor into a parameter frame. These architectural state values contain the information that can be used to resume execution of the enclave.

Responsive to detecting the page fault, system software executed by processing core 106 may load the missing EPC page 116 from a storage device (e.g., a remote memory or disk). After loading the missing EPC page 116 into memory 104, processing core 106 may re-enter the enclave. As discussed above, in one embodiment, the ERESUME is disabled at the time of entering an enclave, thus forcing to reenter the enclave by executing EENTER instruction which triggers address pre-translation. In another embodiment, the processor may execute an application program including instructions to disable the ERESUME temporarily and turn the call to ERESUME into the call to EENTER. As such, any resumption of the enclave starts from address pre-translation before resuming the enclave using EPOPSSA.

In one embodiment, processing core 106 may disable the ERESUME instruction (e.g., by setting a flag bit in SECS 114) to force all enclave re-entries through EENTER, thus ensuring there is no unfinished address pre-translation. Execution of EPOPSSA may retrieve the architectural state values from the top parameter frame in the SSA stack and resume address pre-translation based on these architectural state values.

After the address pre-translation for an enclave code, all memory address mappings are stored in locked area 140 in TLB 112. During the execution of the enclave code of the application after the address pre-translation phase, processing core 106 may look up the memory address mappings stored in the locked area 140. Since they are already pre-translated and stored in locked area 140, the execution of the enclaved code by processing core 106 does not encounter the situation of missing physical memory pages. Because all physical memory pages are pre-translated and loaded into memory 104 in enclave address space 122, no pages faults are generated for an attacker. Thus, the embodiment may substantially eliminate the risk of software control side channel attacks.

Figure 3:
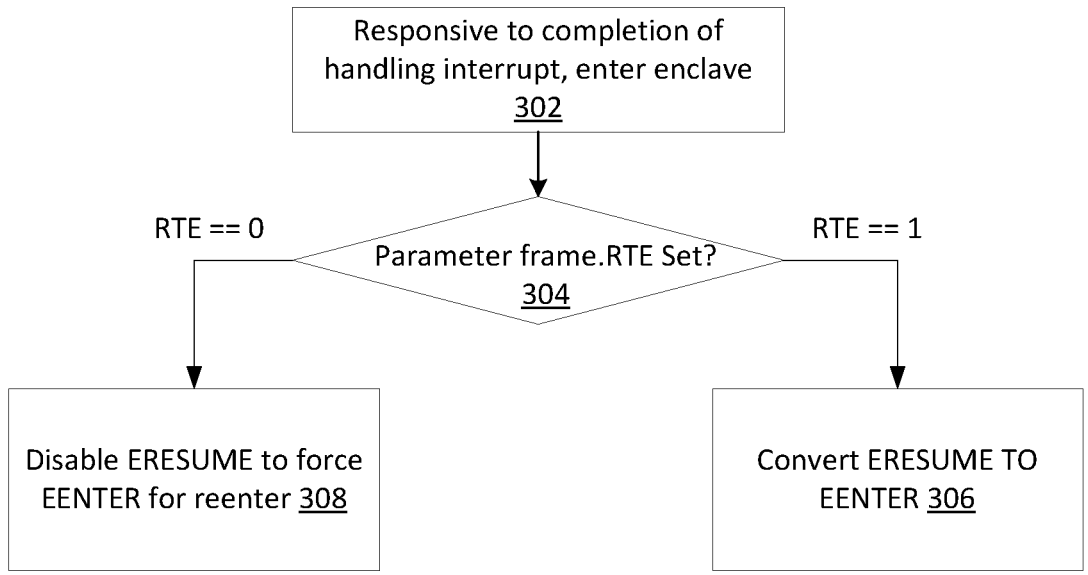
FIG. 3 illustrates the process to resume an interrupted address pre-translation according to an embodiment of the present disclosure.

In one embodiment, a bit flag (referred to as RTE 144) may be used to indicate whether the CPU should convert ERESUME to EENTER so the pre-translation can be executed before the enclave execute EPOPSSA to continue execution of enclaved code. FIG. 3 illustrates the process to resume an interrupted address pre-translation according to an embodiment of the present disclosure. As shown in FIG. 3, at 302, processing core 106 may have handled an interrupt event (e.g., load a missing physical memory page into memory). Responsive to the completion of the handling of interruption event, processing core 106 may reenter the enclave. At 304, processing core 106 may determine whether the RTE flag bit of the current parameter frame is set (e.g., set to "1"). If the RTE bit is set, the ERESUME command is converted to EENTER. If the RTE bit is not set, the ERESUME is disabled when entering the enclave. Responsive to determining that the RTE flag bit is not set (or set to "0"), at 308, processing core may disable the ERESUME and start the execution of the enclaved code using EENTER. Responsive to determining that the RTE flag bit is set (to "1"), at 306, processing core 106 may convert the ERESUME command into EENTER and start address pre-translation again.

Figure 4:
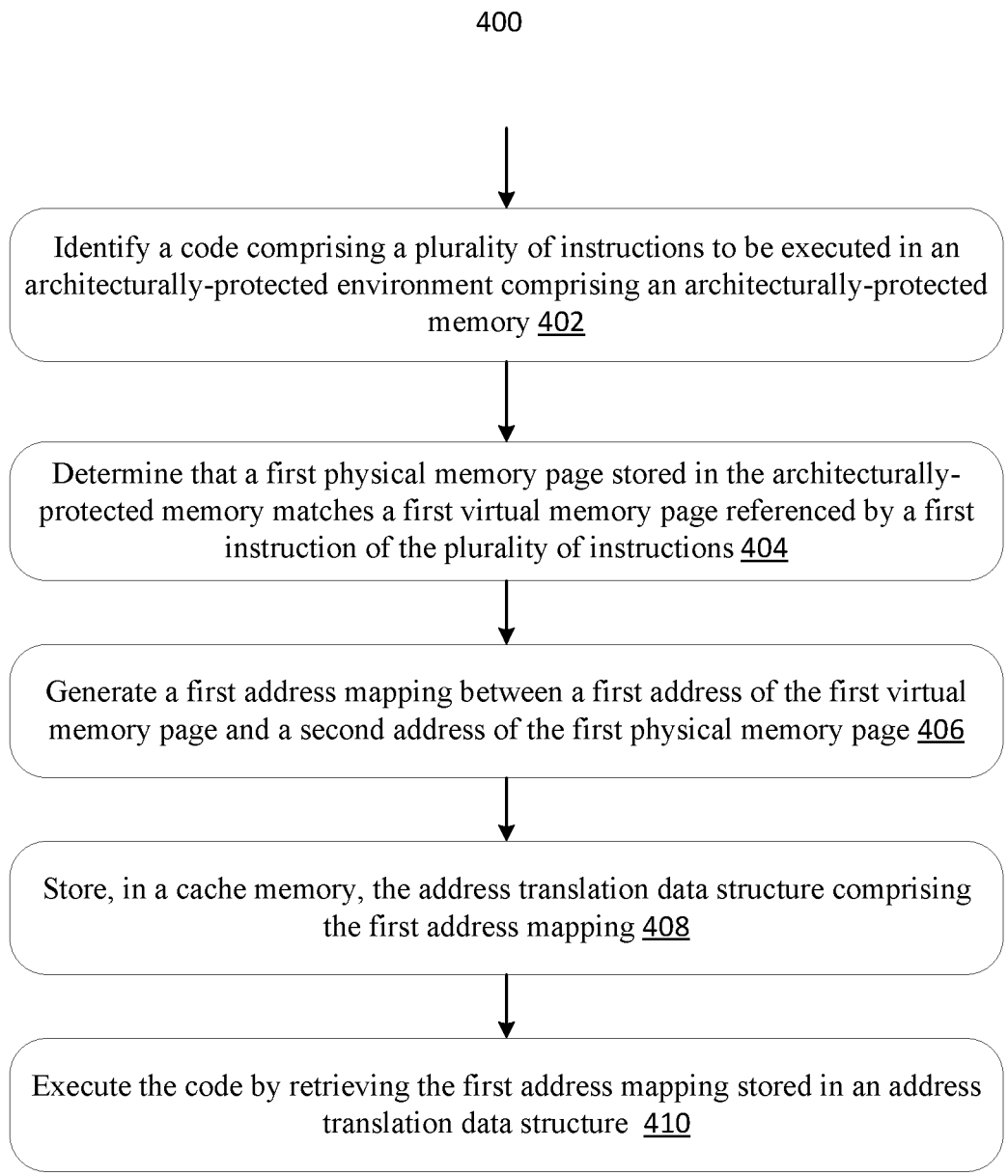
FIG. 4 is a block diagram of a method to perform address pre-translation according to an embodiment of the present disclosure.

FIG. 4 is a block diagram of a method 400 to perform address pre-translation according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of processor 102 and SoC 100 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at 402, processing core 106 may identify a code comprising a plurality of instructions to be executed in an architecturally-protected environment comprising an architecturally-protected memory.

At 404, processing core 106 may determine that a first physical memory page stored in the architecturally-protected memory matches a first virtual memory page referenced by a first instruction of the plurality of instructions.

At 406, the processing core 106 may generate a first address mapping between a first address of the first virtual memory page and a second address of the first physical memory page.

At 408, the processing core may store, in a cache memory, an address translation data structure comprising the first address mapping.

At 410, the processing core may execute the code by retrieving the first address mapping stored in the address translation data structure.

Figure 5A:
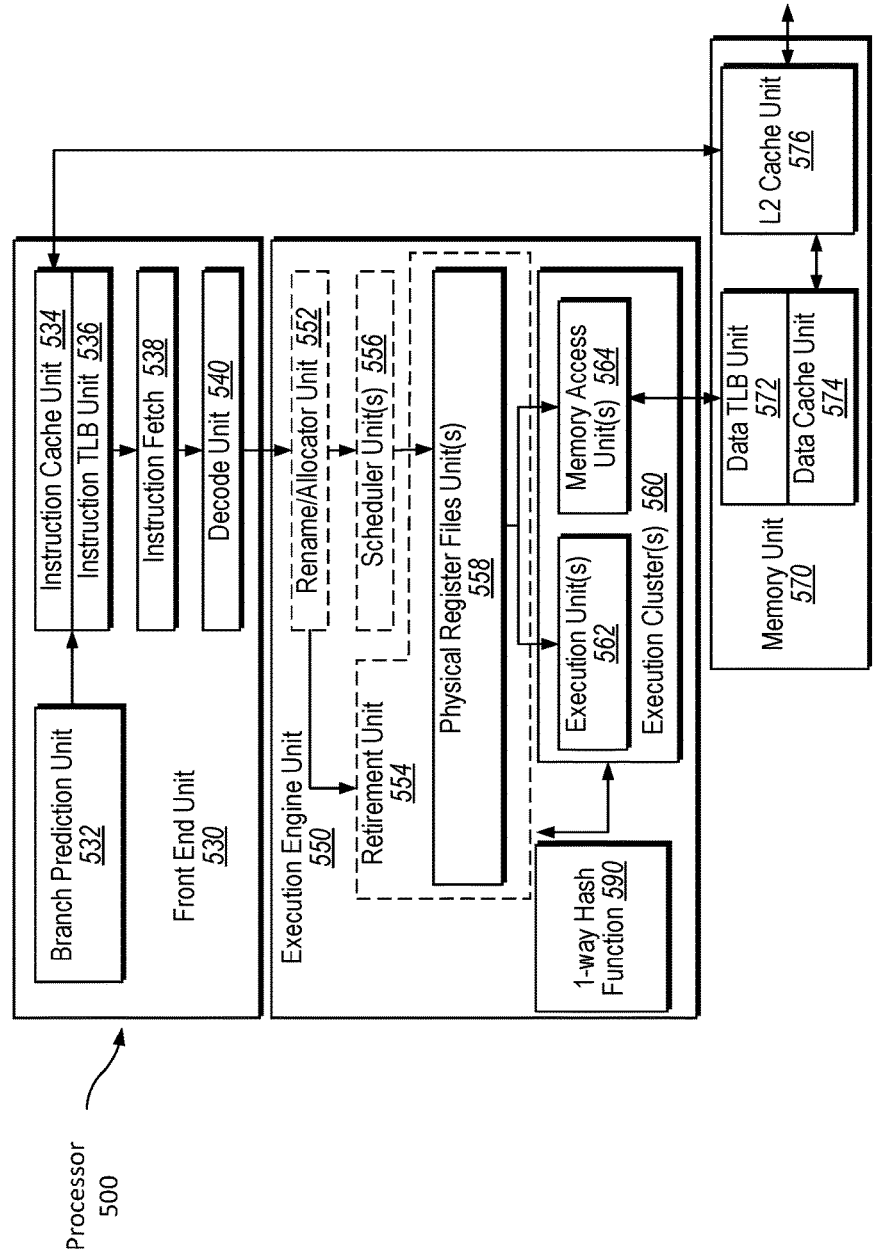
FIG. 5A is a block diagram illustrating a micro-architecture for a processor including heterogeneous core in which one embodiment of the disclosure may be used.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
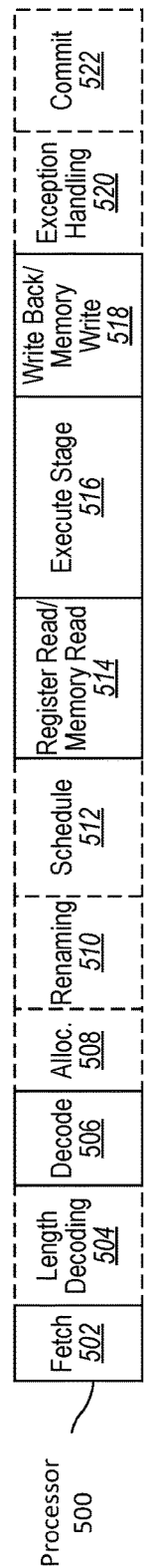
FIG. 5B is a block diagram illustrating an in-order pipeline and a register renaming stage, out-of-order issue/execution pipeline implemented according to at least one embodiment of the disclosure.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
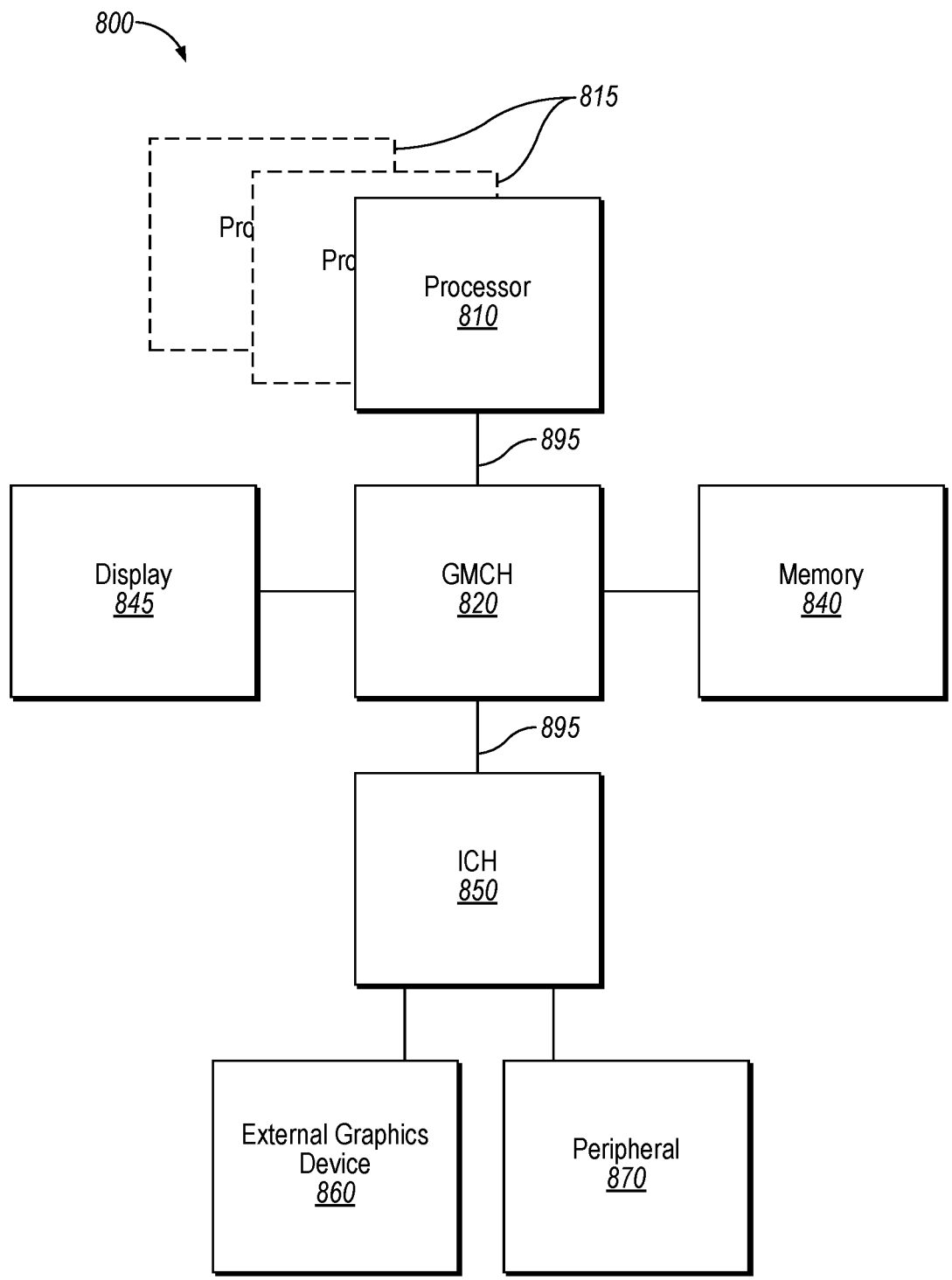
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
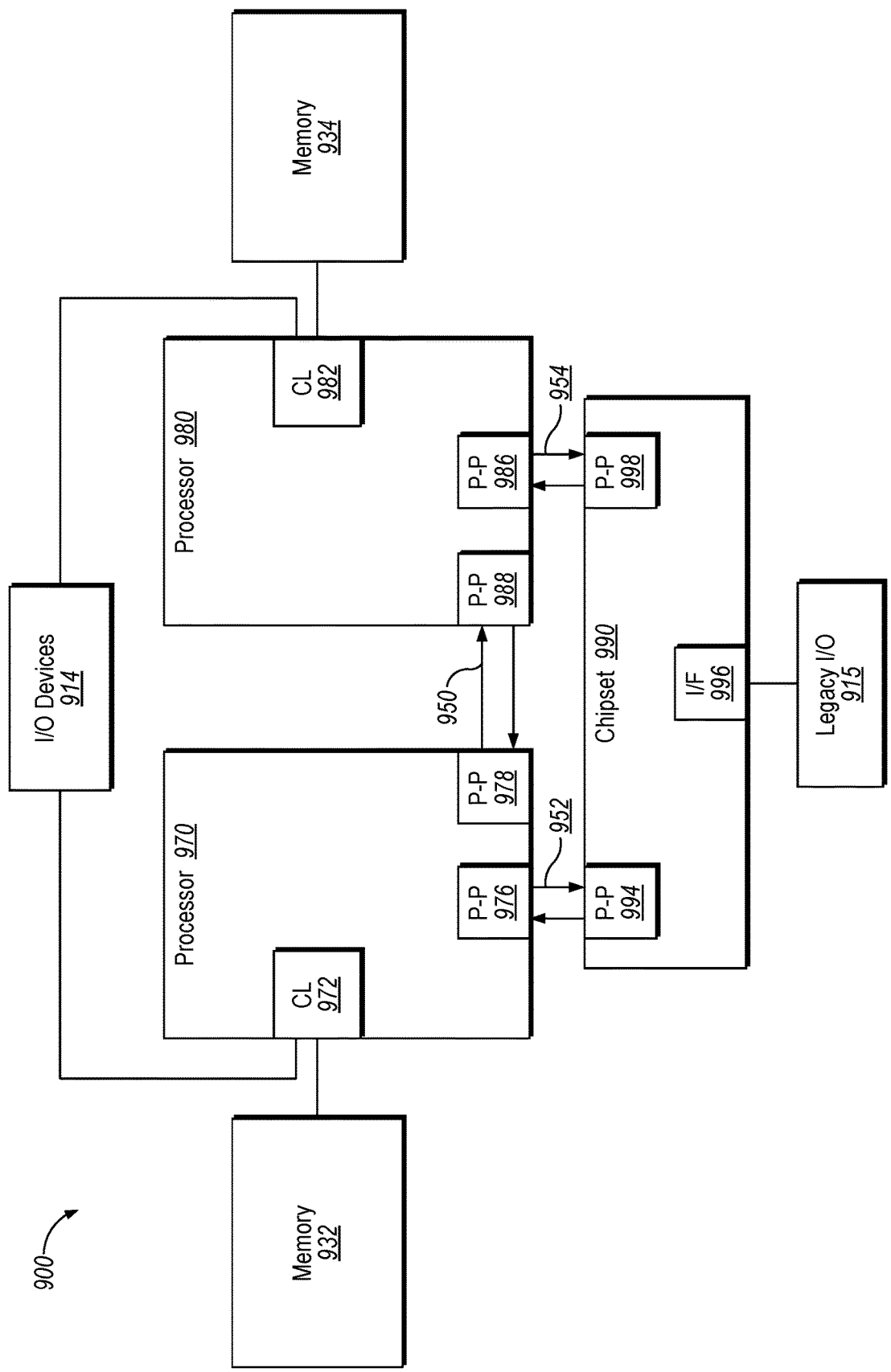
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
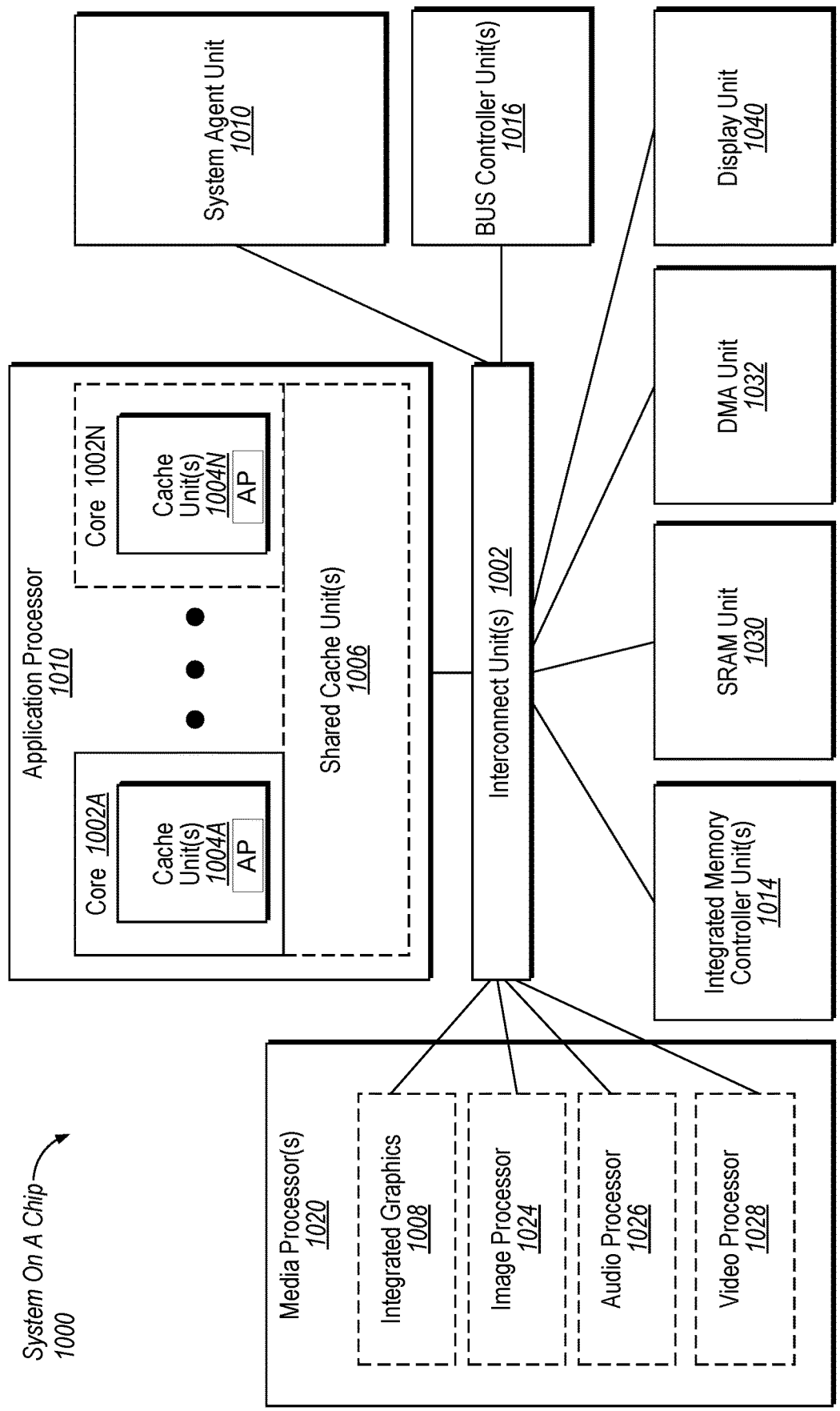
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
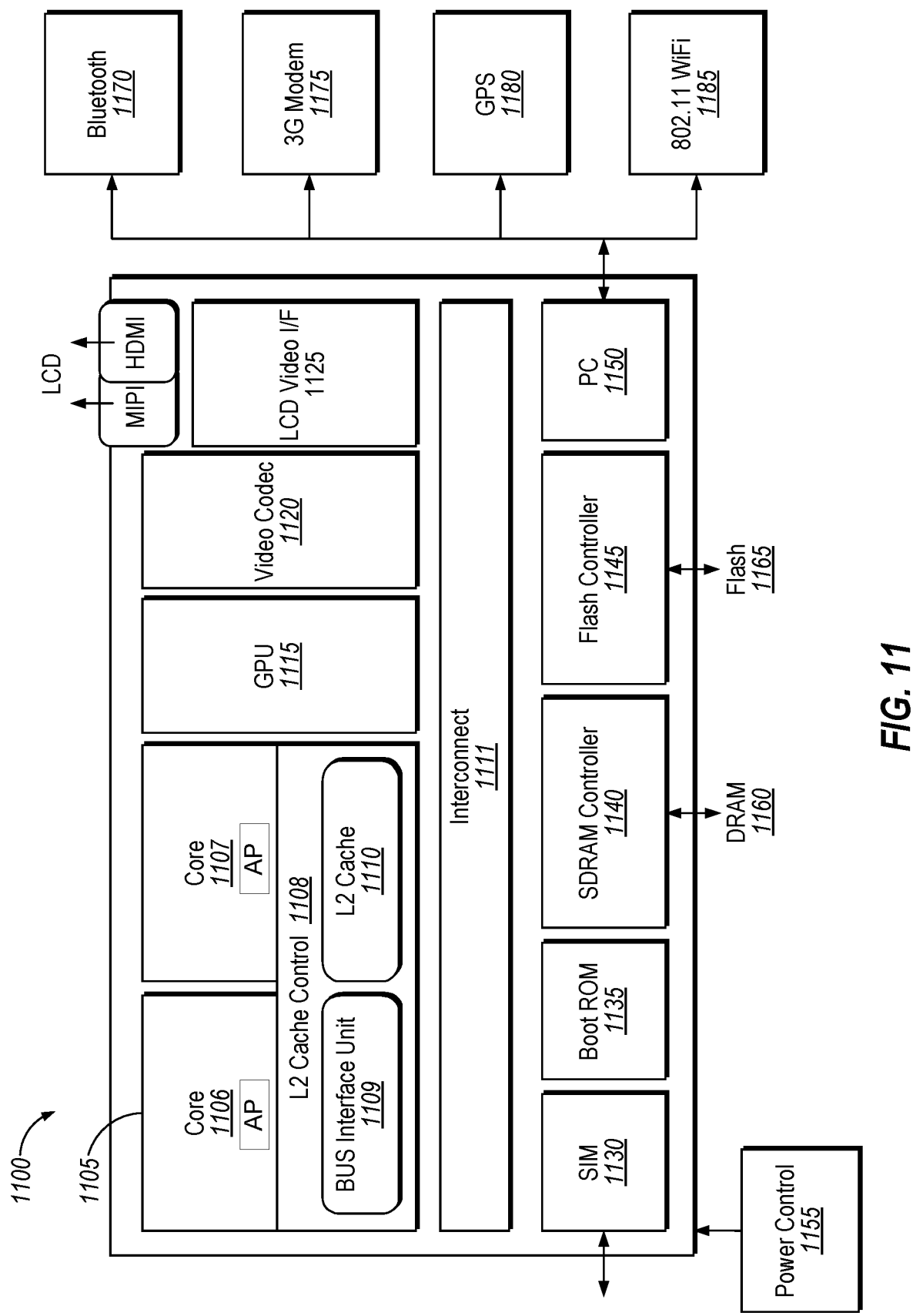
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores-1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
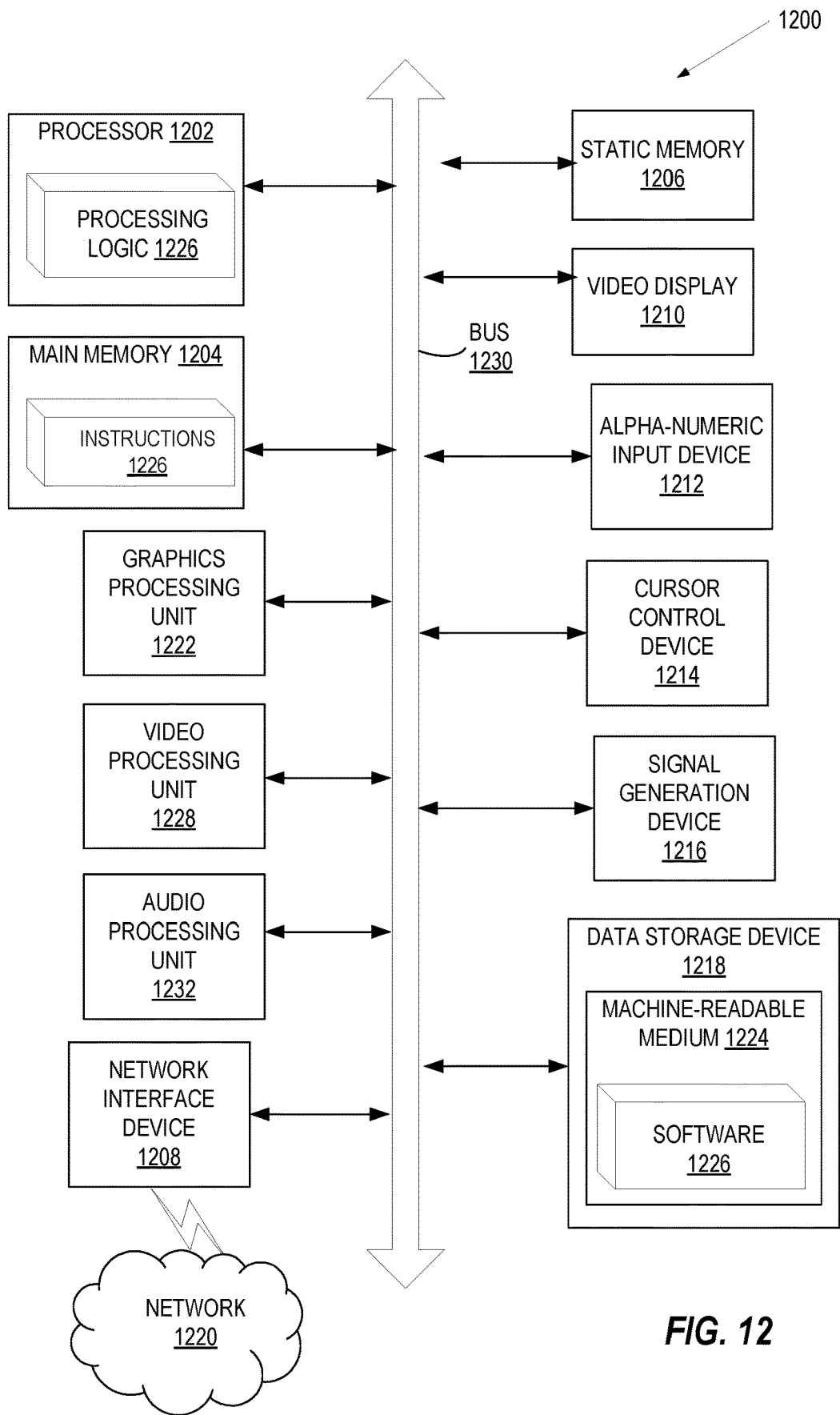
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor comprising a cache memory, and a processing core, communicatively coupled to an architecturally-protected environment comprising an architecturally-protected memory, the processing core to identify a code comprising a plurality of instructions to be executed in the architecturally-protected environment, determine that a first physical memory page stored in the architecturally-protected memory matches a first virtual memory page referenced by a first instruction of the plurality of instructions, generate a first address mapping between a first address of the first virtual memory page and a second address of the first physical memory page, store, in the cache memory, an address translation data structure comprising the first address mapping, and execute the code by retrieving the first address mapping stored in the address translation data structure.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element.

A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
a cache memory; and
a processing core to:
execute a create instruction to create an architecturally-protected environment comprising an architecturally-protected memory;

identify a code comprising a plurality of instructions to be executed in the architecturally-protected environment;
execute a preamble instruction after execution of the create instruction and prior to execution of the plurality of instructions, wherein execution of the preamble instruction triggers pre-translation of virtual memory pages to physical memory pages that are to be used by the code;
lock an area of the cache memory, wherein the locked area is not an eviction victim when the cache memory is full;
determine that a first physical memory page stored in the architecturally-protected memory matches a first virtual memory page referenced by a first instruction of the plurality of instructions;
generate a first address mapping between a first address of the first virtual memory page and a second address of the first physical memory page;
store, in the locked area of the cache memory, an address translation data structure comprising the first address mapping; and
execute the code by retrieving the first address mapping stored in the address translation data structure of the locked area of the cache memory.

2. The processor of claim 1, wherein the architecturally-protected environment is a secure enclave execution environment.

3. The processor of claim 1, wherein the architecturally-protected memory comprises a plurality of physical memory pages provided by an enclave page cache (EPC) comprising a plurality of EPC pages.

4. The processor of claim 1, wherein the address translation data structure in the locked area of the cache memory comprises a plurality of address mappings to map all virtual memory pages referenced by the plurality of instructions to physical memory pages.

5. The processor of claim 1, wherein to generate the address translation data structure, the processing core is further to:
determine that a second virtual memory page referenced by a second instruction of the plurality of instructions does not match any physical memory pages in the architecturally-protected memory;
store an architectural state of the processing core in a state save area of the architecturally-protected memory; and
exit the architecturally-protected environment.

6. The processor of claim 5, wherein responsive to exiting the execution of the code, the processing core is further to:
retrieve, from a storage device communicatively coupled to the processor, a second physical page matching the second virtual memory page into the architecturally-protected memory;
reenter the architecturally-protected environment to continue generating the address translation data structure from the architectural state; and
retrieve the architectural state stored in the state save area.

7. The processor of claim 5, wherein the state save area comprises a flag indicating a resumption mode for the architecturally-protected environment, and wherein
responsive to determining that the flag is set to a first value, disable an enclave resume command; and
responsive to determine that the flag is set to a second value, convert the enclave resume command to an enclave enter command.

8. The processor of claim 5, further comprising a memory management unit to generate a page fault responsive to determining that the second virtual memory page does not match any physical memory pages in the architecturally-protected memory, wherein the processing core is further to, responsive to detecting the page fault, retrieve, from a storage device communicatively coupled to the processor, a second physical page matching the second virtual memory page into the architecturally-protected memory.

9. The processor of claim 1, wherein the processing core is further to flush the locked area of the cache memory subsequent to executing the code.

10. A system comprising:
an architecturally-protected environment comprising an architecturally-protected memory; and
a processor, communicatively coupled to the architecturally-protected environment, the processor comprising:
a cache memory; and
a processing core to:
execute a create instruction to create the architecturally-protected environment comprising the architecturally-protected memory;
identify a code comprising a plurality of instructions to be executed in the architecturally-protected environment;
execute a preamble instruction after execution of the create instruction and prior to execution of the plurality of instructions, wherein execution of the preamble instruction triggers pre-translation of virtual memory pages to physical memory pages that are to be used by the code;
lock an area of the cache memory, wherein the locked area is not an eviction victim when the cache memory is full;
determine that a first physical memory page stored in the architecturally-protected memory matches a first virtual memory page referenced by a first instruction of the plurality of instructions;
generate a first address mapping between a first address of the first virtual memory page and a second address of the first physical memory page;
store, in the locked area of the cache memory, an address translation data structure comprising the first address mapping; and
execute the code by retrieving the first address mapping stored in the address translation data structure of the locked area of the cache memory.

11. The system of claim 10, wherein the architecturally-protected environment is a secure enclave execution environment.

12. The system of claim 10, wherein the architecturally-protected memory comprises a plurality of physical memory pages provided by an enclave page cache (EPC) comprising a plurality of EPC pages.

13. The system of claim 10, wherein the processing core is to store, in the locked area of the cache memory, all of a set of address mappings needed to map all virtual memory pages referenced by the plurality of instructions to physical memory pages in the address translation data structure prior to executing the code.

14. The system of claim 10, wherein to generate the address translation data structure, the processing core is further to:
determine that a second virtual memory page referenced by a second instruction of the plurality of instructions does not match any physical memory pages in the architecturally-protected memory;
store an architectural state of the processing core in a state save area of the architecturally-protected memory; and
exit the architecturally-protected environment.

15. The system of claim 14, wherein responsive to exiting the execution of the code, the processing core is further to:
retrieve, from a storage device communicatively coupled to the processor, a second physical page matching the second virtual memory page into the architecturally-protected memory;
reenter the architecturally-protected environment to continue generating the address translation data structure from the architectural state; and
retrieve the architectural state stored in the state save area.

16. The system of claim 14, wherein the state save area comprises a flag indicating a resumption mode for the architecturally-protected environment, and wherein responsive to determining that the flag is set to a first value, disable an enclave resume command; and
responsive to determine that the flag is set to a second value, convert the enclave resume command to an enclave enter command.

17. The system of claim 14, further comprising a memory management unit to generate a page fault responsive to determining that the second virtual memory page does not match any physical memory pages in the architecturally-protected memory, wherein the processing core is to: responsive to detecting the page fault, retrieve, from a storage device communicatively coupled to the processor, a second physical page matching the second virtual memory page into the architecturally-protected memory.

18. The system of claim 10, wherein the processing core is further to flush the locked area of the cache memory subsequent to executing the code.

19. A method comprising:
executing, by a processor, a create instruction to create an architecturally-protected environment comprising an architecturally-protected memory;
identifying, by the processor, a code comprising a plurality of instructions to be executed in the architecturally-protected environment comprising the architecturally-protected memory;
executing, by the processor, a preamble instruction after execution of the create instruction and prior to execution of the plurality of instructions, wherein executing the preamble instruction triggers pre-translation of virtual memory pages to physical memory pages that are to be used by the code;
locking, by the processor, an area of a cache memory, wherein the locked area is not an eviction victim when the cache memory is full;
determining, by the processor, that a first physical memory page stored in the architecturally-protected memory matches a first virtual memory page referenced by a first instruction of the plurality of instructions;
generating a first address mapping between a first address of the first virtual memory page and a second address of the first physical memory page;
storing, in the locked area of the cache memory, an address translation data structure comprising the first address mapping; and
executing the code by retrieving the first address mapping stored in the address translation data structure of the locked area of the cache memory.

20. The method of claim 19, wherein the architecturally-protected environment is a secure enclave execution environment, and wherein the architecturally-protected memory comprises a plurality of physical memory pages provided by an enclave page cache (EPC) comprising a plurality of EPC pages.

* * * * *